April 29, 1952 W. D. FLING 2,594,630
TAPE-ROLL AND REEL ASSEMBLY
Filed Nov. 10, 1949

INVENTOR.
WENTWORTH D. FLING
BY Laurence B. Dodds
ATTORNEY

Patented Apr. 29, 1952

2,594,630

UNITED STATES PATENT OFFICE 2,594,630

TAPE-ROLL AND REEL ASSEMBLY

Wentworth D. Fling, Port Washington, N. Y., assignor to Fairchild Recording Equipment Corporation, a corporation of New York Application November 10, 1949, Serial No. 126,518

10 Claims. (Cl. 242—55)

Figures 1, 2, 3:
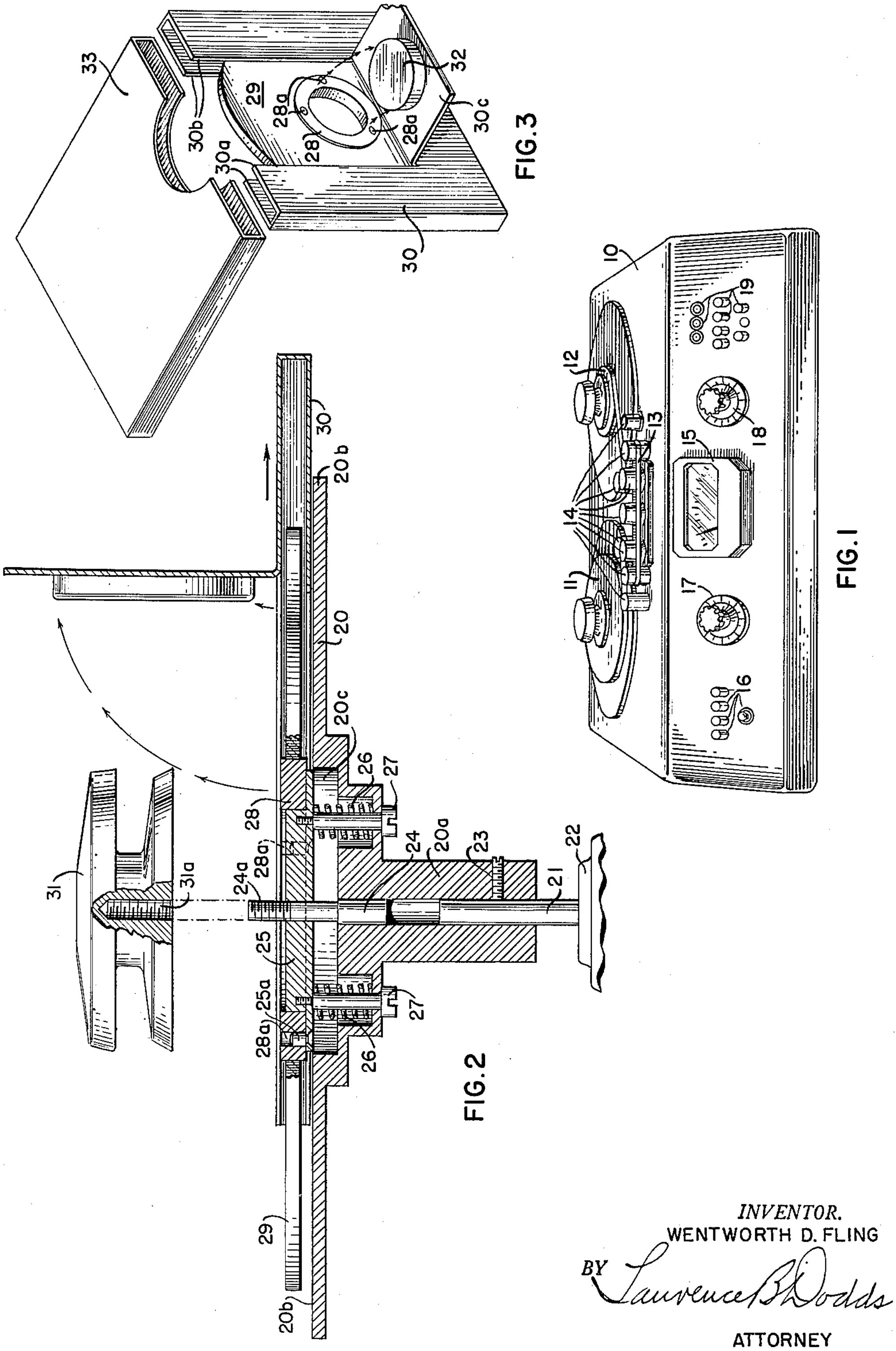

This invention relates to an electrical apparatus for translating the signal of a signal-carrying tape-roll assembly and particularly to a reel and tape-roll assembly for use therein and to the reel mechanism and tape-roll assembly constituting components thereof. The invention is particularly suitable for embodiment in magnetic tape recorders and reproducers and will be specifically described in such an embodiment.

One of the problems encountered in the design of satisfactory magnetic tape recorders and reproducers is that of transporting and handling the magnetic tape, which is generally supplied in rolls. One of the serious difficulties in the use of such rolls of magnetic tape has been the always-present danger of losing part or all of the programme as a result of the spilling of the tape from the roll during operation of the apparatus. This can be eliminated by using two-sided reels, but their advantages are more than offset by their high cost, weight, bulkiness, and lack of rigidity in sizes large enough to handle a programme of a half-hour or more, so that they are subject to deformation or other damage in handling. To avoid these disadvantages, there has been used a removable disc which is a sort of one-sided reel. This considerably facilitates the handling of the tape, but is also subject to the spilling of the tape roll and exposes the tape to damage during handling or mishandling. This one-sided reel is also subject to bending or deformation in transporting.

It is an object of the present invention, therefore, to provide a new and improved reel and tape-roll assembly which obviates one or more of the above-mentioned disadvantages of the prior art tape-roll assemblies.

It is another object of the invention to provide a new and improved reel and tape-roll assembly which is simple, economical in construction, and one in which the tape-roll assembly may be readily loaded and unloaded in the recording and reproducing apparatus and which greatly facilitates the handling, shipping, and storage of the tape-roll assemblies without damage.

It is a further object of the invention to provide a new and improved reel mechanism suitable for use in the reel and tape-roll assembly of the invention.

It is a further object of the invention to provide a new and improved tape-roll assembly particularly suitable for use with the reel mechanism of the invention.

In accordance with the invention there is provided in an electrical apparatus for translating the signal of a signal-carrying tape-roll initially disposed in a transportable container, a reel and tape-roll assembly comprising a rotatable disc having a supporting surface and an axially movable central hub, means for biasing the hub toward a position extending from said supporting surface, and a tape-roll assembly comprising a central core and a roll of tape wound thereon and adapted to be disposed on the hub without removal from or interference from its container. The hub and core include provisions for engagement of one by the other to ensure proper registration therebetween and upon engagement to permit removal of the tape-roll container. The assembly also includes means for actuating the hub against the biasing means to a position in which, upon withdrawal of the tape-roll container, the roll of tape is supported by the disc for reeling.

Further in accordance with the invention, there is provided in an electrical apparatus for translating the signal of a signal-carrying tape-roll assembly including a central core, a roll of tape wound thereon and a removable container, a reel mechanism comprising a rotatable disc having a supporting surface and an axially movable central hub including provisions for securing engagement with a tape-roll assembly to ensure proper registration therebetween, and means for biasing the hub toward a position extending from the supporting surface, whereby a tape-roll assembly may be disposed on said hub for engagement therewith without removal from or interference from its container. The mechanism also includes means for actuating the hub against the biasing means to a position in which, upon withdrawal of the tape-roll container, a roll of tape disposed therein is supported by the disc for reeling.

Further in accordance with the invention, a signal-carrying tape-roll assembly for use in an electrical signal-translating apparatus comprises a central core, a roll of tape wound thereon, and an open-ended box-like container, opposite faces of the container being slotted from the open edges thereof to the center, whereby the core may be engaged with a signal-translating apparatus while in the container and the container withdrawn without interfering with such engagement.

By the term "signal-carrying tape" as used herein and in the appended claims is meant a tape or belt on which a signal is impressed or is to be impressed in any suitable manner as by magnetization of a layer of magnetic material or by photochemical action on a layer of photosensitive material carried thereby or the converse—a photosensitive development thereof. By the term "tape roll" as used herein and in the appended claims is meant a quantity of signal-carrying tape wound into roll form, as on a reel, hub, core, or the like.

For a better understanding of the present invention, together with other and further objects thereof, reference is had to the following description taken in connection with the accompanying drawing, and its scope will be pointed out in the appended claims.

Referring now to the drawing, Fig. 1 is a perspective view, partially schematic, of a complete electrical apparatus for recording and reproducing the signal of a signal-carrying tape-roll assembly embodying the invention; Fig. 2 is a cross-sectional detail view of a reel and tape-roll assembly comprising the invention and including the transportable container for the tape roll; while Fig. 3 is a perspective view of a tape roll and its transportable container.

Referring now to Fig. 1 of the drawing, there is represented an electrical apparatus for recording and reproducing the signal of a signal-carrying tape-roll assembly. This apparatus comprises a housing or casing 10 carrying on its upper face a pair of reel and tape-roll assemblies 11 and 12, each of which has the construction illustrated in Fig. 2 of the drawing and described in detail hereinafter. A magnetic tape 13 which is being unwound from one of the tape rolls, for example, the roll 11, and re-wound on the other tape roll 12 passes around a series of rollers, driving capstans, and play-back, record, and erase heads, collectively represented as 14, since they represent no part of the present invention. On the front face of the housing 10 is provided a volume indicator meter 15 and a series of controls 16, 17, 18, and 19 which may also be conventional in form and constitute no part of the present invention.

Referring now to Fig. 2 of the drawing, there is illustrated a reel and tape-roll assembly embodying the invention and comprising a disc 20 rotatable about a vertical axis. To this end the disc 20 is provided with a hub 20*a* mounted on a vertical shaft 21 of a driving motor 22 and secured to the shaft 21 as by a set screw 23. The disc 20 is provided with a central spindle 24 secured in the hub 20*a* and projecting vertically upward and having a threaded portion 24*a*. The upper surface 20*b* of disc 20 constitutes a supporting surface for the tape roll to be described.

The disc 20 is also provided with an axially movable central hub 25 which is movable vertically upward and downward in a cylindrical recess 20*c* of the disc 20. The apparatus also includes means for biasing the hub 25 vertically upward toward a position extending from and above the supporting surface 20*b*. This means may be in the form of a plurality of helical springs 26 positioned by cap screws or studs 27 disposed in holes in the disc 20 at peripherally spaced points about the hub 25 into which the cap screws 27 are secured. It is seen that the springs 26 support the hub 25 from the disc 20 and bias it vertically above the supporting surface 20*b* thereof.

The apparatus of Fig. 2 also includes a tape-roll assembly comprising a central core 28 on which a roll of signal-carrying tape 29 is wound in a conventional manner. The tape-roll assembly 28, 29 is initially disposed in a transportable removable container 30 illustrated in Fig. 3.

The tape-roll assembly 28, 29 is adapted to be disposed on the hub 25 without removal from or interference from its container 30. To this end, the hub 25 and core 28 include provisions for engagement of one by the other to ensure proper registration therebetween and upon engagement to permit removal of the container 30. Specifically, the core 28 is provided with one or more registration holes 28*a*, while the hub 25 is provided with a corresponding number of pins 25*a* for engaging the holes 28*a*.

The apparatus of Fig. 2 also includes means for actuating the hub 25 downwardly against the biasing springs 26. This means may be in the form of a retaining cap 31 having a threaded central bore 31*a* for engaging the threaded portion 24*a* of spindle 24, thereby to actuate the hub 25 downwardly to a position in which, upon withdrawal of the tape-roll container 30, the reel of tape 29 is supported by the surface 20*b* of disc 20. When the retaining cap 31 is screwed down tight, it serves to lock the core 28 in that position as by clamping it to the disc 20 for winding and unwinding.

In Fig. 3 is illustrated an open-ended transportable flat box-like container 30 for the tape-roll assembly 28, 29. Opposite faces of the container are slotted from the open edges 30*a* thereof to form wide slots 30*b*, 30*b* extending beyond the central portion of the container. The container has a hinged flap 30*c* at the root of one of the face slots 30*b* and there is mounted thereon a hub 32 for engaging the central aperture of the core 28 and supporting the core upon closing of the flap. The container 30 is also provided with a telescoping cover 33 effective, upon telescoping, to retain the flap 30*b* in its closed position and thus provide a simple, lightweight, compact, transportable tape-roll assembly package suitable for shipping and storing.

The operation of the electrical signal-recording and reproducing apparatus as a whole is conventional. In utilizing the reel and tape-roll assembly of the invention a blank tape roll 29 is initially wound on its core 28 in a conventional manner. The assembly 28, 29 is then inserted in its container 30 and the flap 30*c* is closed so that the hub 32 engages and supports the core 28. The telescoping cover 33 is then applied and the unit is ready for shipment or storage. To place a tape roll on the recording and reproducing apparatus for use, the cover 33 is removed and the tape-roll assembly is disposed on the hub 25 by engagement of the pins 25*a* with the registration holes 28*a* of core 28 without removal from the container 30. As clearly shown in Fig. 2, the biasing springs 26 are effective to bias the hub 25 upwardly to a position in which the core 28 rests on the hub 25, while providing sufficient space so that there is no interference from the container 30 which straddles the hub 25. The container 30 is then withdrawn from the tape-roll assembly 28, 29 and the retaining cap is screwed into position, depressing the tape-roll assembly to its proper operating position in which the roll of tape 29 is supported on the surface 20*b* of disc 20. In this position, the retaining cap 31 clamps the core 28 to the disc 20 to provide a secure driving engagement therebetween. When the tape-roll assembly has been thus loaded on the recording and reproducing apparatus, for example, the unit 11 of Fig. 1, the tape 13 from the tape roll 29 is threaded through the rollers, capstans, play-back, recording, and erasing heads, etc., in a conventional manner and attached to a core 28 of the unit 12. The recording and reproducing apparatus is then in condition for operation in a conventional manner. When the tape 13 has been re-wound on the core 28 of unit 12, forming a new tape-roll assembly, obviously it may be removed and loaded in a container 30 by reversing the procedure described above for placing a tape-roll assembly in operation.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an electrical apparatus for translating the signal of a signal-carrying tape-roll initially disposed in a transportable container, a reel and tape-roll assembly comprising: a rotatable disc having a supporting surface and an axially movable central hub; means for biasing said hub toward a position extending from said supporting surface; a tape-roll assembly comprising a central core and a roll of tape wound thereon and adapted to be disposed on said hub without removal from or interference from its container; said hub and said core including provisions for engagement of one by the other to ensure proper registration therebetween and upon engagement to permit removal of the tape-roll container; and means for actuating said hub against said biasing means to a position in which, upon withdrawal of the tape-roll container, said roll of tape is supported by said disc for reeling.

2. In an electrical apparatus for translating the signal of a signal-carrying tape-roll initially disposed in a transportable container, a reel and tape-roll assembly comprising: a disc rotatable about a vertical axis and having a supporting surface and an axially movable central hub; means for biasing said hub toward a position vertically above said supporting surface; a tape-roll assembly comprising a central core and a roll of tape wound thereon and adapted to be disposed on said hub without removal from or interference from its container; said hub and said core including provisions for engagement of one by the other to ensure proper registration therebetween and upon engagement to permit removal of the tape-roll container; and means for actuating said hub downwardly against said biasing means to a position in which, upon withdrawal of the tape-roll container, said roll of tape is supported by said disc for reeling.

3. In an electrical apparatus for translating the signal of a signal-carrying tape-roll initially disposed in a transportable container, a reel and tape-roll assembly comprising: a rotatable disc having a supporting surface and an axially movable central hub; means for biasing said hub toward a position extending from said supporting surface; a tape-roll assembly comprising a central core and a roll of tape wound thereon and adapted to be disposed on said hub without removal from or interference from its container; said hub and said core including co-operating pins and holes to ensure proper registration therebetween and upon engagement to permit removal of the tape-roll container; and means for actuating said hub against said biasing means to a position in which, upon withdrawal of the tape-roll container, said roll of tape is supported by said disc for reeling.

4. In an electrical apparatus for translating the signal of a signal-carrying tape-roll initially disposed in a transportable container, a reel and tape-roll assembly comprising: a rotatable disc having a supporting surface and an axially movable central hub; a plurality of springs supporting said hub from said disc at peripherally spaced points and biasing it toward a position extending from said supporting surface; a tape-roll assembly comprising a central core and a roll of tape wound thereon and adapted to be disposed on said hub without removal from or interference from its container; said hub and said core including provisions for engagement of one by the other to ensure proper registration therebetween and upon engagement to permit removal of the tape-roll container; and a retaining cap for actuating said hub against said biasing means to a position in which, upon withdrawal of the tape-roll container, said roll of tape is supported by said disc for reeling and for locking said hub in said position.

5. In an electrical apparatus for translating the signal of a signal-carrying tape-roll initially disposed in a transportable container, a reel and tape-roll assembly comprising: a rotatable disc having a threaded central spindle, a supporting surface and an axially movable central hub; means for biasing said hub toward a position extending from said supporting surface; a tape-roll assembly comprising a central core and a roll of tape wound thereon and adapted to be disposed on said hub without removal from or interference from its container; said hub and said core including provisions for engagement of one by the other to ensure proper registration therebetween and upon engagement to permit removal of the tape-roll container; and a threaded retaining cap for engaging said spindle to actuate said hub against said biasing means to a position in which, upon withdrawal of the tape-roll container, said roll of tape is supported by said disc and to clamp said hub to said disc for reeling.

6. In an electrical apparatus for translating the signal of a signal-carrying tape-roll assembly including a central core, a roll of tape wound thereon and a removable container; a reel mechanism comprising: a rotatable disc having a supporting surface and an axially movable central hub including provisions for securing engagement with a tape-roll assembly to ensure proper registration therebetween; means for biasing said hub toward a position extending from said supporting surface whereby a tape-roll assembly may be disposed on said hub for engagement therewith without removal from or interference from its container; and means for actuating said hub against said biasing means to a position in which, upon withdrawal of the tape-roll container, a roll of tape disposed therein is supported by said disc for reeling.

7. In an electrical apparatus for translating the signal of a signal-carrying tape-roll assembly including a central core, a roll of tape wound thereon and a removable container; a reel mechanism comprising: a disc rotatable about a vertical axis and having a supporting surface and an axially movable central hub including provisions for securing engagement with a tape-roll assembly to ensure proper registration therebetween; means for biasing said hub toward a position vertically above said supporting surface whereby a tape-roll assembly may be disposed on said hub for engagement therewith without removal from or interference from its container; and means for actuating said hub downwardly against said biasing means to a position in which, upon withdrawal of the tape-roll container, a roll of tape disposed therein is supported by said disc for reeling.

8. In an electrical apparatus for translating the signal of a signal-carrying tape-roll assembly including a central core having one or more registration holes, a roll of tape wound thereon and a removable container; a reel mechanism comprising: a rotatable disc having a supporting surface and an axially movable central hub including one or more pins for engaging the holes of a tape-roll assembly to ensure proper registration therebetween; means for biasing said hub toward a position extending from said supporting surface whereby a tape-roll assembly may be disposed on said hub for engagement therewith without removal from or interference from its container; and means for actuating said hub against said biasing means to a position in which, upon withdrawal of the tape-roll container, a roll of tape disposed therein is supported by said disc for reeling.

9. In an electrical apparatus for translating the signal of a signal-carrying tape-roll assembly including a central core, a roll of tape wound thereon and a removable container; a reel mechanism comprising: a rotatable disc having a supporting surface and an axially movable central hub including provisions for securing engagement with a tape-roll assembly to ensure proper registration therebetween; a plurality of springs supporting said hub form said disc at peripherally spaced points and biasing it toward a position extending from said supporting surface whereby a tape-roll assembly may be disposed on said hub for engagement therewith without removal from or interference from its container; and a retaining cap for actuating said hub against said biasing means to a position in which, upon withdrawal of the tape-roll container, a roll of tape disposed therein is supported by said disc for reeling and for locking said hub in said position.

10. In an electrical apparatus for translating the signal of a signal-carrying tape-roll assembly including a central core, a roll of tape wound thereon and a removable container; a reel mechanism comprising: a rotatable disc having a threaded central spindle, a supporting surface and an axially movable central hub including provisions for securing engagement with a tape-roll assembly to ensure proper registration therebetween; means for biasing said hub toward a position extending from said supporting surface whereby a tape-roll assembly may be disposed on said hub for engagement therewith without removal from or interference from its container; and a threaded retaining cap for engaging said spindle to actuate said hub against said biasing means to a position in which, upon withdrawal of the tape-roll container, a roll of tape disposed therein is supported by said disc and to clamp said hub to said disc for reeling.

WENTWORTH D. FLING.

REFERENCES CITED

The following references are of record in the file of this patent:

UNITED STATES PATENTS

| Number | Name | Date |
|---|---|---|
| 431,794 | Anderson | July 8, 1890 |
| 1,175,995 | Ronchetti | Mar. 21, 1916 |
| 1,288,207 | Ruggles | Dec. 17, 1918 |
| 2,116,735 | Stevens | May 10, 1938 |
| 2,129,198 | Crouch et al. | Sept. 6, 1938 |
| 2,483,729 | Greenleaf | Oct. 4, 1949 |

FOREIGN PATENTS

| Number | Country | Date |
|---|---|---|
| 119,972 | Great Britain | Oct. 24, 1918 |